US011686141B2

(12) United States Patent
Schwepper et al.

(10) Patent No.: US 11,686,141 B2
(45) Date of Patent: Jun. 27, 2023

(54) ANTI-TRAP SYSTEM FOR AN OPEN ROOF ASSEMBLY

(71) Applicant: Inalfa Roof Systems Group B.V., Oostrum (NL)

(72) Inventors: Gerrit Schwepper, Kampf-Lintfort (DE); Dennie Wilhelmus Hendrikus Craane, Nijmegen (NL); Suyanto Ten-Jet-Foei, Nijmegen (NL); Jochem van de Pol, Arnhem (NL); Stephan Christiaan Vervoort, Boxmeer (NL); Remco Roland Slagter, Venray (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 101 days.

(21) Appl. No.: 16/698,185

(22) Filed: Nov. 27, 2019

(65) Prior Publication Data

US 2020/0173219 A1 Jun. 4, 2020

(30) Foreign Application Priority Data

Nov. 30, 2018 (EP) ...................................... 18209592
Nov. 30, 2018 (EP) ...................................... 18209611

(51) Int. Cl.
*E05F 15/44* (2015.01)
*E05F 15/41* (2015.01)
(Continued)

(52) U.S. Cl.
CPC ............ *E05F 15/443* (2015.01); *B60J 7/047* (2013.01); *B60J 7/0573* (2013.01); *E05F 15/41* (2015.01);
(Continued)

(58) Field of Classification Search
CPC . E05F 15/431; E05F 15/443; E05Y 2900/542
See application file for complete search history.

(56) References Cited

U.S. PATENT DOCUMENTS 4,468,063 A * 8/1984 Yukimoto .................. B60J 7/04
296/223
5,955,854 A * 9/1999 Zhang ..................... G01S 17/04
318/480
(Continued)

FOREIGN PATENT DOCUMENTS

CA       2398943 A1 *  8/2001  ............. E05F 15/43
DE    102007045420 B3    2/2009
(Continued)

OTHER PUBLICATIONS

European Search Report and Written Opinion for 19211721.6, dated Mar. 27, 2020.
(Continued)

*Primary Examiner* — Marcus Menezes
(74) *Attorney, Agent, or Firm* — Steven M. Koehler; Westman, Champlin & Koehler, P.A.

(57) ABSTRACT

An open roof assembly is configured for providing a closable roof opening in a vehicle roof. Thereto, the open roof assembly comprises a closure member that is moveably arranged for opening and closing the roof opening and a detection system for detecting an object in the roof opening. The detection system is configured to provide an entrapment signal if a foreign object is detected in the roof opening, when the closure member is moving and a collision may occur. The detection system is further configured to provide an operating signal, when an object is detected performing a predefined action. Based on the operating signal a control unit may execute an associated function.

6 Claims, 7 Drawing Sheets

(51) Int. Cl.
*E05F 15/43* (2015.01)
*B60J 7/047* (2006.01)
*B60J 7/057* (2006.01)

(52) U.S. Cl.
CPC ...... *E05F 15/431* (2015.01); *E05F 2015/436* (2015.01); *E05Y 2900/542* (2013.01)

(56) References Cited

U.S. PATENT DOCUMENTS

| | | | |
|---|---|---|---|
| 6,186,586 B1* | 2/2001 | Lindinger | B60J 10/82 |
| | | | 296/214 |
| 6,701,673 B1 | 3/2004 | Kessler et al. | |
| 8,282,157 B2 | 10/2012 | Kato et al. | |
| 8,720,279 B2* | 5/2014 | Ogawa | H03K 17/955 |
| | | | 73/780 |
| 9,797,178 B2* | 10/2017 | Elie | E05F 15/44 |
| 10,329,824 B2* | 6/2019 | Takehara | E05F 15/44 |
| 2002/0040266 A1* | 4/2002 | Edgar | E05F 15/46 |
| | | | 701/49 |
| 2005/0276449 A1* | 12/2005 | Pedemas | E05F 15/431 |
| | | | 382/104 |
| 2008/0006763 A1* | 1/2008 | Vosburgh | E05F 15/46 |
| | | | 250/205 |
| 2008/0074067 A1* | 3/2008 | Rhodes | E05F 15/431 |
| | | | 318/280 |
| 2008/0297076 A1* | 12/2008 | Sakai | E05F 15/41 |
| | | | 318/286 |
| 2009/0049750 A1* | 2/2009 | Ito | E05F 15/431 |
| | | | 49/31 |
| 2010/0287837 A1* | 11/2010 | Wuerstlein | H03K 17/955 |
| | | | 49/26 |
| 2010/0327633 A1 | 12/2010 | Kato et al. | |
| 2012/0035814 A1 | 2/2012 | Tissot | |
| 2012/0125078 A1* | 5/2012 | Iott | E05F 15/443 |
| | | | 73/1.82 |
| 2013/0125467 A1* | 5/2013 | Ezzat | E05F 15/431 |
| | | | 49/26 |
| 2016/0145927 A1* | 5/2016 | Hirakawa | B60J 10/246 |
| | | | 296/1.04 |
| 2018/0100342 A1* | 4/2018 | Ikeda | E05F 15/73 |
| 2018/0238095 A1* | 8/2018 | Nagao | E05F 15/46 |
| 2019/0003232 A1* | 1/2019 | Kobayashi | E05F 15/431 |
| 2019/0337366 A1* | 11/2019 | Kawaguchi | E05F 15/41 |

FOREIGN PATENT DOCUMENTS

| | | |
|---|---|---|
| EP | 2270301 A2 | 1/2011 |
| JP | H0359280 A | 3/1991 |
| WO | 2013116940 A1 | 8/2013 |

OTHER PUBLICATIONS

European Search Report dated May 31, 2019, for corresponding European Patent Application No. 18209592.7, filed Nov. 30, 2018.
European Search Report dated May 14, 2019, for corresponding European Patent Application No. 18209611.5, filed Nov. 30, 2018.

* cited by examiner

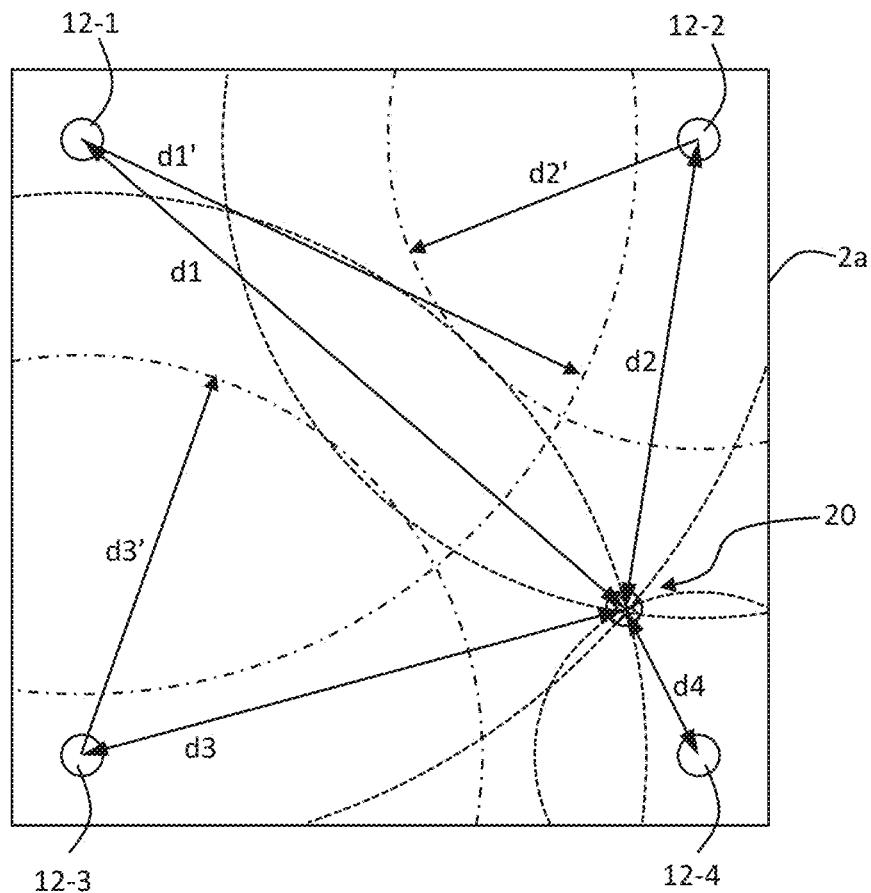
Fig. 4A
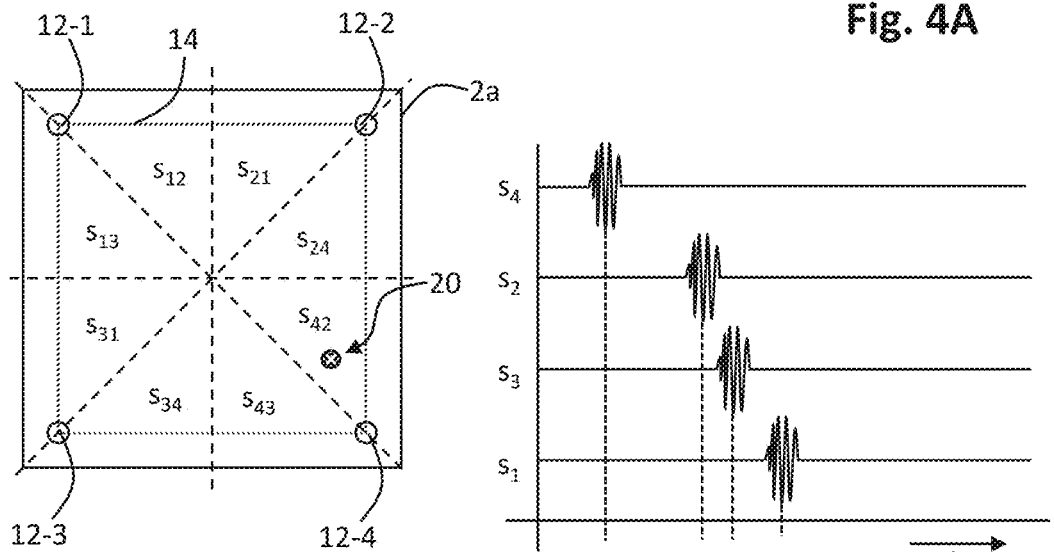
Fig. 4B
Fig. 4C

ANTI-TRAP SYSTEM FOR AN OPEN ROOF ASSEMBLY

BACKGROUND

The discussion below is merely provided for general background information and is not intended to be used as an aid in determining the scope of the claimed subject matter.

The present invention relates to an open roof assembly for use in a vehicle to provide a roof opening and in particular to a detection system for such open roof assembly to detect an object in the roof opening. Further, the present invention relates to a corresponding method and computer program product.

An anti-trap system (ATS) is commonly used in an open roof assembly in order to avoid dangerous situations when a foreign object is becoming stuck between a closure member and an edge of the roof opening. This is done by stopping or reversing the movement of the closure member when the obstruction is detected so as to allow the foreign object to be removed from this position obstructing the closure member.

The detection of the presence of an obstructing foreign object is normally done indirectly. An increase in the resistance within the system is detected by measuring the motor speed and/or the electrical current supplied to the motor. However, there may be a relatively large slack in a drive assembly between the electric motor and the closure member, especially in a drive cable between the operating mechanism and the electric motor due to play between the drive cable and the cable guide. As a result, there is a certain time lapse between the start of the obstruction by the foreign object and the detection. Furthermore, there is a delay due to the flywheel effect of the rotor in the electric motor requiring time to stop and reverse the rotation of the electric motor. Therefore, this type of detection takes relatively long before the pinched foreign object is freed again.

To improve the detection of a foreign object different methods and systems are known. For example, accelerometers may be employed to detect an unexpected sudden change in velocity of the closure member during movement. In another example, radiation, e.g. an infrared beam, or ultrasound may be employed in the roof opening to detect a foreign object in the roof opening. Due to the additional costs, these systems may not be commercially preferred. On the other hand, to meet national and/or regional vehicle safety requirements, such a detection system may be needed in addition to or as an alternative to another detection system, in particular if the closure member is controllable from a distance, e.g. by a remote control or even through an Internet connection.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof assembly is configured for providing a closable roof opening in a vehicle roof. The open roof assembly comprises a closure member that is moveably arranged for opening and closing the roof opening. The open roof assembly comprises a detection system for detecting an object in the roof opening, wherein the detection system is configured to provide an entrapment signal or an operating signal dependent on the detected object. In particular, the detection system is configured to determine at least one property of the detected object, to select a signal from a group of signals, the group comprising at least an entrapment signal and an operating signal, dependent on the determined at least one property of the object, and to provide the selected signal.

In the open roof assembly, the detection system is not only functional with respect to detecting a foreign object for safety reasons. The detection system has added value in that the detection system provides a user interface function. Thereto, at least one property of the object is determined. For example, a position of the object may be determined. Such a position may reveal that the object is at a location where entrapment is not possible, e.g. if the object has touched the closure member in a center area. On the other hand, a touch at a side edge of the closure member, in particular when moving, may be regarded as an entrapment hazard and an entrapment signal may be generated.

As above-mentioned, in case a potential entrapment is detected, an entrapment signal is selected and provided. If the detection system however detects an object or event or action that is not expected to lead to an entrapment such as the touch in a center area as above described, the detection system may select, generate and provide an operating signal, e.g. for opening or closing the closure member. In particular, events or actions may be predefined in the detection system such that upon detection of such event or action, the detection system is configured to provide an associated operating signal.

The entrapment signal and the operating signal may be provided to a control unit that operates a drive assembly, wherein the drive assembly is operatively coupled to the closure member. The drive assembly usually comprises an electric motor such to move the closure member forward or backward. If the control unit receives the entrapment signal, the control unit may stop the movement of the closure member and usually reverse the movement of the closure member such to prevent the entrapment of the foreign object.

The operating signal may instruct the control unit to perform any kind of user controlled operation. For example, the closure member may be operated to open or close. The operating signal may instruct to open or close a blind cover that may be provided to block light through the closure member, if the closure member comprises a glass panel. The operating signal may relate to an integrated lighting. As apparent to those skilled in the art, any kind of operation may be instructed through the detection system.

It is noted that an operating signal may have more than one resulting action. The resulting action may, for example, depend on a state of the open roof assembly. For example, touching the closure member in a closed state may result in the closure member sliding to an open state, while in the open state the same touch may result in the closure member sliding to the closed state.

Thus, the additional costs for the detection system is used to advantage to provide for an easy and simple user interface. Due to the added functionality, the additional costs may be commercially feasible and thus cost-effective.

In an embodiment of the open roof assembly, the entrapment signal is provided when a detected object prevents the closure member from moving to a predetermined position. The detected object may be in contact with the closure member preventing movement thereof or the object may just be detected at a position where it will prevent the closure member from moving to the predetermined position if the object is not timely removed from the roof opening. Of course, in the latter case, the movement of the closure member may not be directly stopped or reversed. For example, the velocity of the closure member may be reduced and/or an audible or visible warning may be generated. As soon as a potentially dangerous situation occurs, the closure member may still be stopped.

In an embodiment of the open roof assembly, the operating signal is provided when the detected object performs a predefined action. The predefined action may be any kind of action. In this respect, the detection technique of the detection system defines the possibly detectable actions. For example, the action may comprise a location dependency, a movement dependency, a size or shape dependency, or any other kind of object-related dependency.

In an embodiment, the detection system comprises a mechanical impact detection and localization system. The mechanical impact detection and localization system is configured to detect a mechanical impact and to localize the mechanical impact. In this embodiment, the entrapment signal is provided when a mechanical impact is detected in an edge section of the moveable panel and the operating signal is provided when a mechanical impact is detected in a center section of the moveable panel. With the use of a suitable number of accelerometers, for example, it is enabled to detect a mechanical impact and to localize where the impact occurred. So, coupling the number of accelerometers to the closure member allows to detect whether a mechanical impact occurred in a center section of the closure member, where entrapment is highly unlikely, or in an edge section of the closure member, which is close to an opening between a frame of the open roof assembly and the closure member such that an entrapment is more likely.

In an embodiment of the open roof assembly, the detection system comprises an optical detection system for detecting an object in an opening, wherein the optical detection system comprises an optical transmitter for transmitting a light beam and an optical receiver for detecting the light beam. Based on a radiation beam, e.g. an infrared beam, an object may be detected contact-free. Essentially two techniques are available. In a first embodiment, the radiation beam is reflected by a foreign object and the reflected beam is detected by the receiver. In a second and probably more reliable embodiment, the radiation beam is directed at the receiver continuously. As soon as a foreign object blocks the radiation beam, the lack of radiation on the receiver results in a presence of the foreign object in the path of the radiation beam being detected.

In a particular embodiment, the detection system comprises a number of transmitters and a number of receivers, wherein a radiation beam of a transmitter is directed at each of the number of receivers. In this embodiment, the detection technique is based on blocking a continuous beam. With the radiation beam of a transmitter being directed at multiple receivers, a larger field of detection may be provided with a minimum of additional components and corresponding costs.

In a further particular embodiment, the radiation beam from each of the number of transmitters is modulated, wherein the modulation of the radiation beam from a transmitter differs from the modulation of the radiation beam from the other transmitters. As known from the prior art, the transmitter may provide a modulated radiation beam, which may be regarded as a transmitter identifying signal. A modulation pattern is predetermined and assessment of the modulation of the radiation received by a receiver it is possible to determine whether the received radiation actually originates from one of the transmitters and not from e.g. sunlight. With multiple transmitters and each transmitter having its own modulation pattern, i.e. its own identifying signal, it is enabled to determine from the received radiation the one or more transmitters from which the radiation originates.

In a further particular embodiment, each receiver is operatively coupled to a control unit to supply a received radiation signal, wherein the received radiation signal represents an amount of radiation received at the receiver, and wherein the control unit is configured to derive from the received radiation signal from which transmitter the radiation originates.

With each transmitter sending a differently modulated radiation beam, the radiation may be traced back to the sending transmitter, even if the radiation from multiple transmitters is received as a combined radiation beam. In such embodiment and as apparent to those skilled in the art, the modulation patterns may need to be selected carefully in this embodiment. The radiation received at a receiver may comprise the modulated radiation from multiple transmitters. With suitably selected modulation patterns and using common signal processing techniques, the patterns may be separated again. Thus, a contribution from each transmitter in the received radiation may be determined. For example, if a single frequency modulated radiation beam is used, a frequency of a first transmitter should preferably not be a harmonic frequency of the frequency of a second transmitter. Other properties may be relevant as well. A person skilled in the art of signal design and signal processing readily understand how to design a number of signals such that the signal contributions in a combined signal will be retrievable from such combined signal.

In a further particular embodiment, the control unit is configured to derive an object trajectory from an object moving through the radiation beams from the number of transmitters and wherein one of the entrapment signal and the operating signal is provided based on the object trajectory. With the possibility to trace back the received radiation to the sending transmitters, it is enabled to detect a position of a foreign object in the field of detection. Moreover, tracing the position of the foreign object over time, enables to detect a trajectory of the foreign object. Thus, gesture control is enabled. For example, a finger moving backward through the field of detection may be detected as an operating command from a user. Then, an operating signal is provided to instruct the control unit to slide the closure member open into an open position, while a finger moving forward through the field of detection may instruct the control unit to slide the closure member back into a closed position. Other gestures may be defined as well, as apparent to those skilled in the art. If a foreign object does not move or does not move according to a predetermined trajectory, an entrapment signal may be provided. Based on the entrapment signal, possibly in combination with an indication of the position of the foreign object, the control unit may either stop a movement of the closure member or provide an audible or visible user warning.

In an embodiment of the open roof assembly, the detection system comprises an optical detection system for detecting an object in an opening, wherein the optical detection system comprises an optical imaging device with a field of view that at least partly overlaps with the open roof assembly and in particular overlaps with the opening in the roof when the closure member is in the open state. The optical image device generates digital images, e.g. a video stream of images, that may be analysed by suitable software processing to detect the presence of an object. In a particular embodiment, the optical imaging device may further be configured to detect at least one of a gesture, a weather condition, a lighting condition, a sunshade position, as well as other conditions, aspects and object properties. Corresponding signals may be generated and provided by the detection system of the present invention.

In an aspect, the present invention further provides a vehicle comprising the open roof assembly according to the present invention.

In a further aspect, the present invention provides a method of operating an open roof assembly, wherein the open roof assembly is configured for providing a closable roof opening in a vehicle roof. The open roof assembly comprises a closure member that is moveably arranged for opening and closing the roof opening. The method comprises the steps of detecting an object in the roof opening and providing an entrapment signal or an operating signal dependent on the detected object. In particular, the method comprises the further steps of determining at least one property of the detected object, selecting a signal from a group of signals, the group comprising at least an entrapment signal and an operating signal, dependent on the determined at least one property of the object, and providing the selected signal.

In an embodiment of the method, the method comprises detecting the object based on a mechanical impact on the open roof assembly, detecting a location of impact, and selecting the entrapment signal or the operating signal dependent on the detected location of the impact.

In an embodiment of the method, the method comprises detecting the object based on a blocked beam of radiation, detecting a position of the object in a field of detection, wherein the field of detection comprises a number of radiation beams, and selecting the entrapment signal or the operating signal dependent on the position of the object over time.

In a further aspect, the present invention provides a computer program product comprising computer-readable instructions for instructing a control unit to perform the method according to the present invention. The computer program product may be supplied in any suitable way. For example, the computer program product may be provided on a computer readable medium or may be supplied through a data communication connection, e.g. over the Internet.

BRIEF DESCRIPTION OF THE DRAWINGS

FIG. 4A shows a top view of a closure member for illustrating an embodiment of an analysis method for use with the first embodiment;

FIG. 4B shows a top view of a closure member for illustrating an embodiment of an analysis method for use with the first embodiment;

FIG. 4C shows a graph of wave signals corresponding to the embodiments of FIGS. 4A and 4B;

DETAILED DESCRIPTION OF THE ILLUSTRATIVE EMBODIMENTS

Figure 1A:
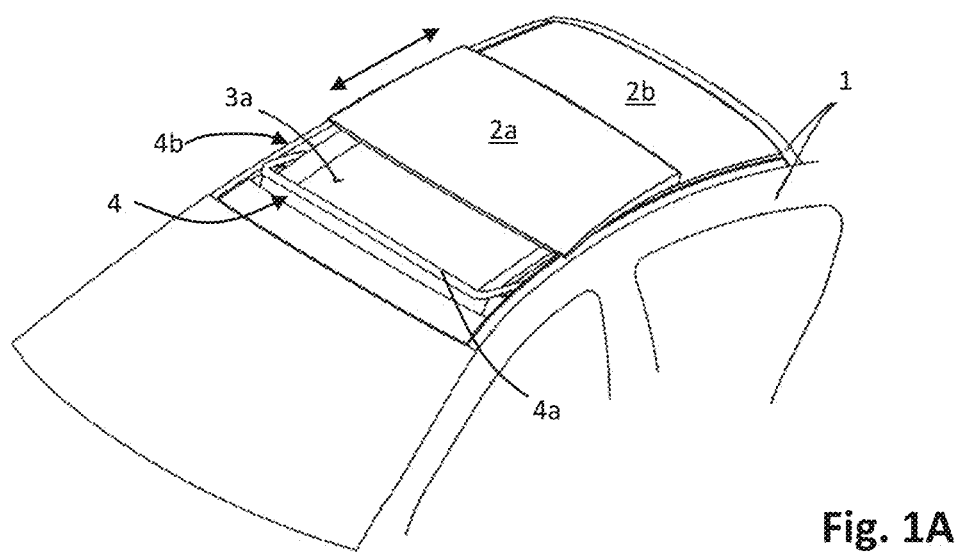
FIG. 1A shows a perspective view of a vehicle roof with an open roof assembly.

Some applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

Aspects of the present invention will now be described with reference to the accompanying drawings, wherein the same reference numerals have been used to identify the same or similar elements throughout the several views.

FIG. 1 illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. Aspects of the present invention are however not limited to passenger cars. Any other kind of vehicles that may be provided with a moveable panel are contemplated as well.

Figure 1B:
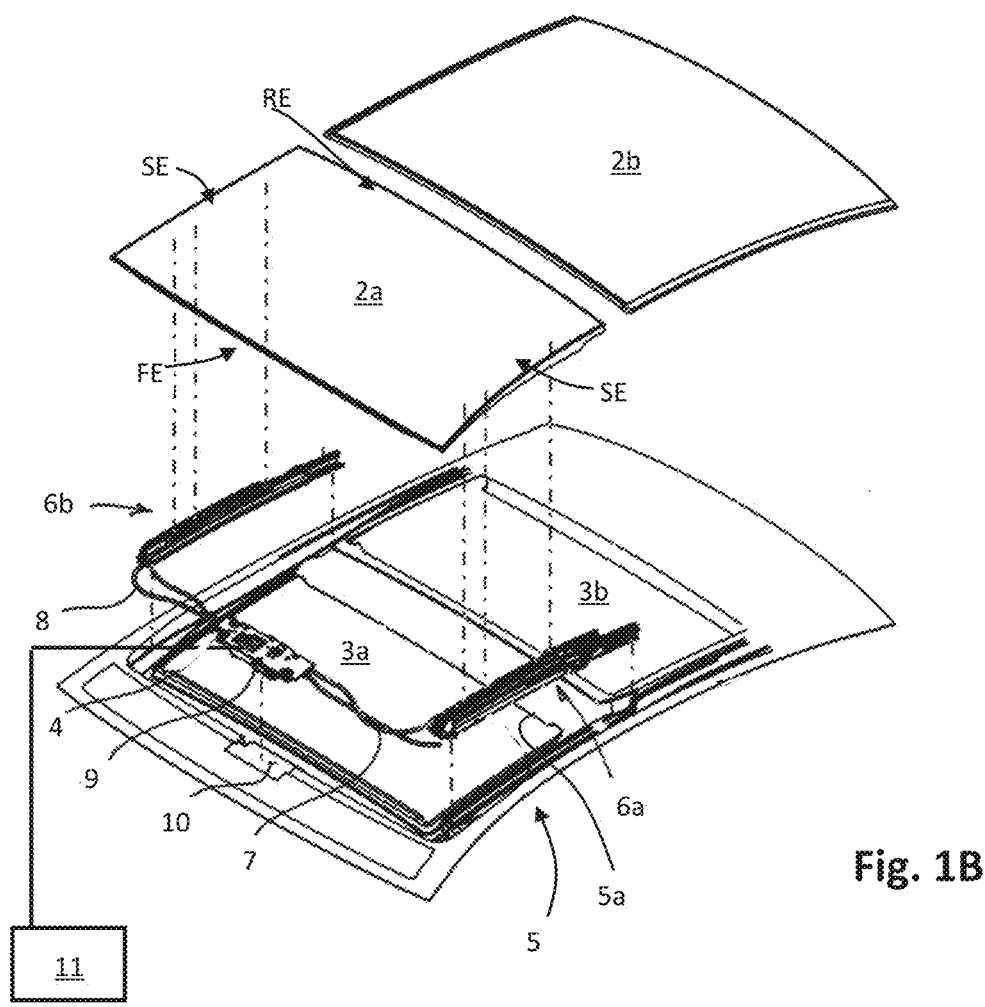
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2*b*, presuming that the fixed panel 2*b* is a glass panel or a similarly transparent panel, for example made of a plastic material or any other suitable material. The second roof opening 3*b* with a transparent or translucent fixed panel 2*b* is optional and may be omitted in another embodiment of the open roof assembly.

The wind deflector 4 is commonly a flexible material, e.g. a woven or non-woven cloth having through holes arranged therein or a web or net. The flexible material is supported by a support structure 4*a*, e.g. a bar-like or tube-like structure, which structure is hingedly coupled, directly or indirectly, to the frame 5 at a hinge 4*b*.

The wind deflector 4 is arranged in front of the first roof opening 3*a* and adapts air flow when the moveable panel 2*a* is in the open position. In its raised position, the wind deflector 4 reduces inconvenient noise due to air flow during driving. When the moveable panel 2*a* is in the closed position or in the tilted position, the wind deflector 4 is held down below the front end FE of the moveable panel 2*a*.

Usually, the wind deflector 4 is raised by a spring force when the moveable panel 2*a* slides to an open position and the wind deflector 4 is pushed down by the moveable panel 2*a* when the moveable panel 2*a* slides back into its closed position. In FIG. 1A, the moveable panel 2*a* is shown in an open position and the wind deflector 4 is shown in a raised position. In FIG. 1B, the moveable panel 2*a* is shown in a closed position and the wind deflector 4 is correspondingly shown in a position in which it is held down.

FIG. 1B further illustrates a drive assembly having a first guide assembly 6*a*, a second guide assembly 6*b*, a first drive cable 7 and a second drive cable 8. The first and second guide assemblies 6*a*, 6*b* are arranged on respective side ends SE of the moveable panel 2*a* and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6*a*, 6*b* and a drive motor 9.

The drive cables 7, 8 couple the drive motor 9 to the mechanisms of the respective guide assemblies 6*a*, 6*b* such that upon operating the drive motor 9, the mechanisms start to move. In particular, a core of the drive cable 7, 8 is moved by the drive motor 9 such to push or pull on the mechanisms of the respective guides 6*a*, 6*b*. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6*a*, 6*b* and, in such embodiment, a drive assembly may be omitted completely.

In the illustrated embodiment, the guide assemblies 6*a*, 6*b* may start movement with raising the rear end RE of the moveable panel 2*a*, thereby bringing the moveable panel 2*a* in the tilted position. Then, from the tilted position, the guide assemblies 6*a*, 6*b* may start to slide to bring the moveable panel 2*a* in the open position. The present invention is however not limited to such embodiment. For example, in another embodiment, the moveable panel 2*a* may be moveable to a tilted position by raising the rear end RE, while an open position is reached by first lowering the rear end RE and then sliding the moveable panel 2*a* under the fixed panel 2*b* or any other structure or element provided behind the rear end RE of the moveable panel 2*a*. In further exemplary embodiments, the moveable panel 2*a* may be merely moveable between a closed position and a tilted position or between a closed position and an open position.

In the illustrated embodiment, the drive motor 9 is mounted near or below the front end FE of the moveable panel 2*a* at a recess 10. In another embodiment, the drive motor 9 may be positioned at any other suitable position or location. For example, the drive motor 9 may be arranged near or below the rear end RE of the moveable panel 2*a* or below the fixed panel 2*b*.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

During movement of the moveable panel 2*a* between the different positions, a foreign object may be arranged in a path of movement of the moveable roof panel 2*a* or any other moving part, e.g. one of the guides 6*a*, 6*b*. Such an object may for example be a finger or hand of a person or the object may be any other thing extending through the roof opening 3*a*. So, it is desired to detect the presence of an obstructing foreign object as soon as possible and to stop or reverse the moveable panel.

Any obstruction or entrapment starts with a collision between a part of the open roof assembly and the foreign object. Such collision may occur between the foreign object and an edge of the roof opening or between the foreign object and the moving part, likely the closure member, i.e. moveable panel 2*a*. The mechanical impact of the collision induces an acoustic wave in both objects, i.e. the foreign object and the part of the open roof assembly. The acoustic wave in the open roof assembly may be detected almost instantaneously and, as a consequence, the first contact between foreign object and open roof assembly may be detected virtually instantaneously, i.e. within a few microseconds. This is shown in FIGS. 2A-2F in more detail.

Figure 2A:
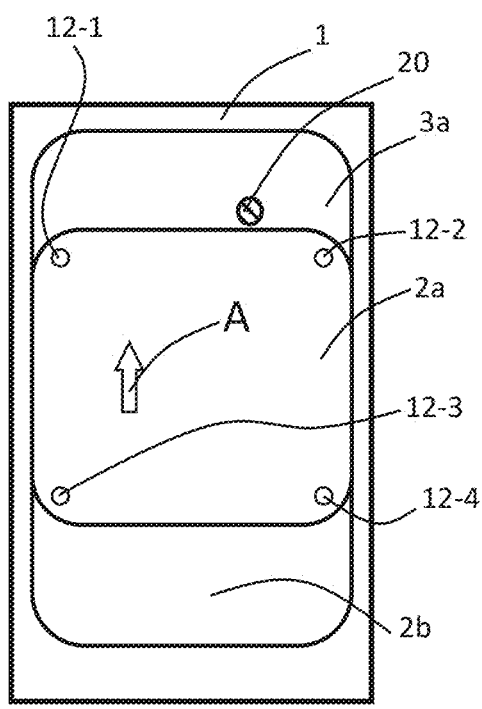
FIG. 2A-2F show a top view of a first embodiment of an open roof assembly.

In FIG. 2A, an embodiment of an open roof assembly 1 is illustrated with the roof opening 3*a*, the moveable panel 2*a* and the fixed panel 2*b*. The moveable panel 2*a* is moving in a direction A. Four accelerometers 12-1, 12-2, 12-3 and 12-4 are arranged on the moveable panel 2*a*, one in every corner of the moveable panel 2*a*. A foreign object 20, which may be a human finger or any other kind of object, is positioned in the path of movement of the moveable panel 2*a*. FIG. 2A illustrates a situation just before the moveable panel 2*a* will collide with the foreign object 20.

Figure 2B:
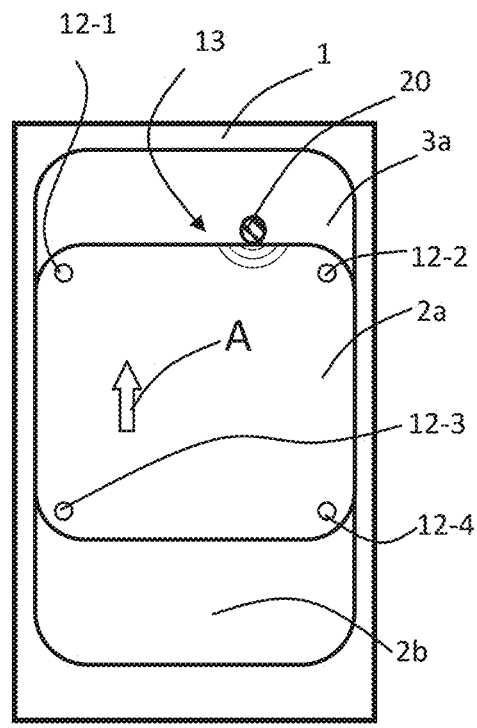

In FIG. 2*b*, at time t0, the moveable panel 2*a* has collided with the foreign object 20. Due to the impact of the collision, an acoustic wave 13 is generated in the moveable panel 2*a*.

Figure 2C:
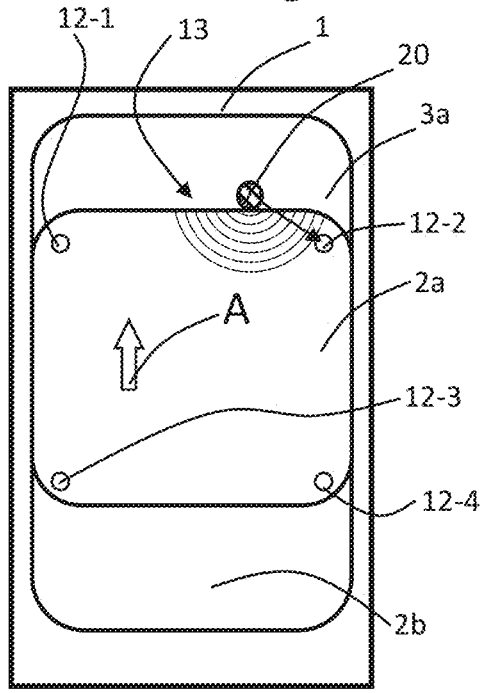

The acoustic wave 13 expands in every direction and a wave front eventually arrives at time t1 at the second accelerometer 12-2 as shown in FIG. 2C. So, at time t1, the second accelerometer 12-2 detects the acoustic wave 13, while the other accelerometers 12-1, 12-3 and 12-4 do not yet detect the acoustic wave 13.

Figure 2D:
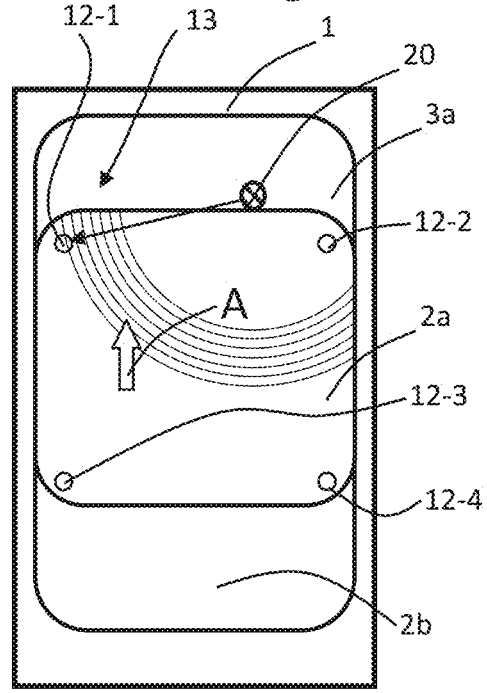
Figure 2E:
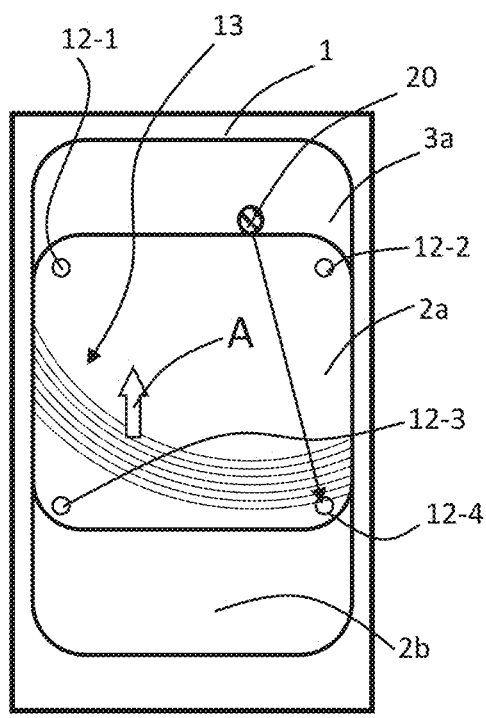
Figure 2F:
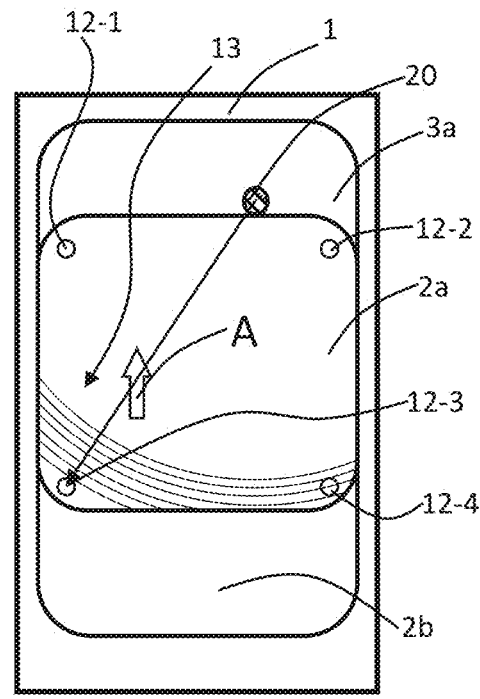

In FIG. 2D the acoustic wave 13 arrives at the first accelerometer 12-1 at time t2. At time t3, as shown in FIG. 2E, the wave front of the acoustic wave 13 reaches the fourth accelerometer 12-4. FIG. 2F shows the arrival of the wave front of acoustic wave 13 at the third accelerometer 12-3 at time t4.

The acoustic wave 13 thus has a circular wave front that moves with a substantially constant velocity. The actual velocity depends on the material properties of the moveable panel 2a. Through experimentation with a glass panel of an actual open roof assembly, it was found that the velocity of the acoustic wave 13 may be in the order of about 2 meters per millisecond or even higher. Considering that the moveable panel 2a commonly is smaller than 1 m in width and length, it appears that the time elapsed between t0 and t4 may be expected to be shorter than 0.5 milliseconds. If the velocity of the acoustic wave is lower in another embodiment, it may still be expected that the collision may be detected within a few milliseconds from mechanical contact with an edge of the moveable panel 2a and a movement of the moveable panel 2a may be stopped or its direction may be reversed.

Figure 3:
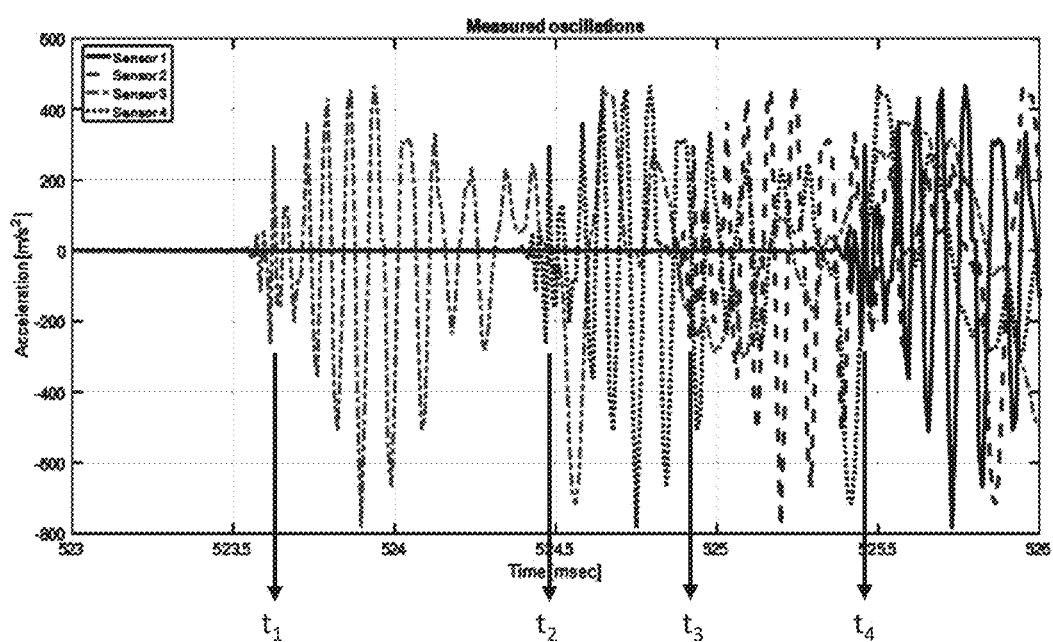
FIG. 3 shows a graph of wave signals as used in the first embodiment.

FIG. 3 shows a graph in which actual wave signals of four accelerometers are plotted against time. The legend of the graph of FIG. 4 indicates four sensors, i.e. accelerometers: sensor 1, sensor 2, sensor 3 and sensor 4. During an experiment, these sensors were arranged on a moveable panel 2a corresponding to the accelerometers 12-1-12-4, as shown in FIGS. 2A-2F, and the illustrated wave signals were recorded. It is noted that the location of impact corresponding to these four wave signals does not correspond to the location of impact as illustrated in FIG. 2A-2F.

At a time t1, sensor 3 starts to detect an acoustic wave generated due to a collision between a foreign object and the moveable panel. At time t2, sensor 4 starts to detect the acoustic wave corresponding to the same collision. At time t3, sensor 2 starts to detect the same acoustic wave and, at time t4, sensor 1 starts to detect the same acoustic wave. As derivable from the graph, in this embodiment, there is a time lapse of less than 2 milliseconds between the first detection by sensor 3 and the last detection by sensor 1.

Based on the detected wave signals and in particular based on their time of arrival at the respective sensors, it is enabled to derive where the location of impact was as is explained in more detail in relation to FIGS. 4A-4C.

FIG. 4A shows the moveable panel 2a with first accelerometer 12-1, second accelerometer 12-2, third accelerometer 12-3 and fourth accelerometer 12-4. A foreign object has contacted/collided with the moveable panel 2a at an impact location 20 at time t0. The impact location 20 is closest to the fourth accelerometer 12-4 at a fourth distance d4, followed by the second accelerometer 12-2 at a second distance d2, the third accelerometer 12-3 at a third distance d3 and the first accelerometer 12-1 at a first distance d1. Hence:

$$d4<d2<d3<d1$$

Corresponding to the spatial distances, the acoustic wave generated by the mechanical impact on the impact location 20 at time t0, the acoustic wave is detected by the respective accelerometers 12-1-12-4. The fourth accelerometer 12-4 detects the acoustic wave at time t1; the second accelerometer 12-2 detects the acoustic wave at time t2; the third accelerometer 12-3 detects the acoustic wave at time t3; and the first accelerometer 12-1 detects the acoustic wave at time t4. The timing of the receipt of the acoustic wave at the respective accelerometers 12-1-12-4 is schematically illustrated in FIG. 4C, wherein s4 represents the wave signal from the fourth accelerometer 12-4; s2 represents the wave signal from the second accelerometer 12-2; s3 represents the wave signal from the third accelerometer 12-3, and s1 represents the wave signal from the first accelerometer 12-1.

Referring to FIG. 4A, with known distances d1-d4, it is enabled to identify the impact location 20. For example, as shown in FIG. 4A, drawing a circle (dashed lines) around each accelerometer 12-1-12-4 at the respective distances d1-d4 provides a single point where all four circles meet, which is the impact location 20. Many mathematical methods are known to find such an intersection of circles. Further, the same intersection is identifiable by use of three circles and, hence, a system with three suitably arranged accelerometers would suffice to identify the impact location 20, at least theoretically.

In practice, however, the time t0 of impact is a priori unknown. Consequently, a time lapse between t0 and t1 is unknown and the distance d4 is unknown. For deriving the impact location 20, the timings of the arrival of the acoustic wave at the respective accelerometers 12-1-12-4, the timing differences may be used. For example, time t1 may be used as a reference timing. With t1 as a reference timing, the time lapse t0-t1 is ignored, initially. Accordingly, the fourth distance d4 is ignored, initially. This results in the remaining three distances d1, d2 and d3 being assumed shorter by a length of the fourth distance d4:

$$d1'=d1-d4$$

$$d2'=d2-d4$$

$$d3'=d3-d4$$

Based on these three assumed distances d1', d2' and d3' three circles (dash-dotted lines) are shown in FIG. 4A. As apparent and as may have been expected, these three circles do not have a single intersection point.

In order to identify the impact location 20 and starting from the known assumed distances d1', d2' and d3', a radius of each of these three dash-dotted circles may be increased with a same value. Increasing the radius of each dash-dotted circles eventually leads to the dashed circles, intersecting at a single location. There is only one value for which these circles intersect at a single location. This value is the fourth distance d4 and said single location is the impact location 20. It is noted that this approach may as well be performed starting with an assumption of d4'=0 such that a combination with just two of the other distances d1', d2' and d3' allows to find an intersection location of three circles.

Mathematical methods are apparent to those skilled in the art for deriving the impact location 20 based on the derived timings of the arrivals of the acoustic wave at the respective accelerometers 12-1-12-4. In practice, these mathematical methods and corresponding calculations are computationally complex and may require relatively high computational power, in particular if such computation needs to be performed in a short time, e.g. in a few milliseconds, preferably in a few microseconds. In an open roof assembly, common control units are not suited to perform such computations in such a short time. A control unit having sufficient computational power is usually not commercially feasible in an open roof assembly.

FIG. 4B shows a simple and computationally effective embodiment of a method to derive the impact location. This embodiment of the method initially focuses on the order of the arrival of the acoustic wave at the respective accelerometers. Based on at which accelerometer the acoustic wave arrives first and where it arrives second, the impact location is within one of eight predetermined sectors $s_{ij}$, which are indicated by the dashed lines and wherein the index i indicates the first accelerometer detecting the acoustic wave and the index j indicates the second accelerometer detecting the acoustic wave.

For example, with an impact on the impact location 20, the resulting acoustic wave arrives first at the fourth accelerometer 12-4 and arrives second at the second accelerometer 12-2 (see also FIG. 4C). Knowing that the acoustic wave has first arrived at the fourth accelerometer 12-4, implies that the impact location 20 is within one of the two sectors s42, s43, since in those two sectors s42, s43 the fourth accelerometer 12-4 is closest. From the impact location 20, the second accelerometer 12-2 is closer than the third accelerometer 12-3 and with the second accelerometer 12-2 detecting the acoustic wave before the third accelerometer 12-3, it is derived that the impact location 20 is within the sector s42. This simple assessment of the first two accelerometers to detect the acoustic wave provides already important information on the impact location. For example, it may be relevant with respect to safety to know whether a collision occurred on the front edge (FIG. 1B: FE), the rear edge (RE) or one of the side edges (SE). This is easily derived.

For more detailed information on the impact location 20, the velocity of the wave front of the acoustic wave may be taken into account. Considering that an impact within a center section 14 of the moveable panel 2a, i.e. a part sufficiently distanced from an edge of the moveable panel 2a, may not be relevant with respect to entrapment, since a foreign object cannot get trapped at such location. The illustrated center section 14 is defined by the locations of the four accelerometers 12-1-12-4. However, a location and dimensions of the center section 14 may be freely selected depending on requirements, specifications and desired functionality, as apparent to those skilled in the art.

Whether the impact location 20 is within the center section 14, or not, may be determined. Moreover, an estimated impact location may be derived from a ratio of the time differences between the arrivals of the acoustic wave at the respective accelerometers 12-1-12-4. For example, in an embodiment, based on a known velocity of the acoustic wave front, the time differences may be transformed to normalized coefficients. Thereto, the time differences may be divided by a time period needed for an acoustic wave front to propagate from the first accelerometer 12-1 to the fourth accelerometer 12-4. Thus, three available time differences may provide for three coefficients:

$$c1=(t2-t1)/T14$$

$$c2=(t3-t1)/T14$$

$$c3=(t4-t1)/T14$$

wherein c1 is a first coefficient, c2 is a second coefficient, c3 is a third coefficient and T14 is the time needed for an acoustic wave front to propagate from the location of the first accelerometer 12-1 to the location of the fourth accelerometer 12-4. Each location of the moveable panel 2a has a unique combination of these coefficients. Thus, with a suitable lookup table, the impact location may be simply derived from the lookup table.

In an embodiment, the look-up operation may be accelerated by creating multiple smaller look-up tables. For example, each sector $s_{ij}$ may have a dedicated look-up table. In such embodiment, the first two accelerometers detecting the acoustic wave determine which look-up table is used to determine a more detailed and more accurate position on the impact location 20.

Further, a coarseness (preciseness) of the impact location determination may be selected by the size of the look-up table. With a small look-up table, the position of the impact location 20 may be derived to be within an area of a certain size, for example an area of 2 cm by 2 cm. However, in a further embodiment, the position of the impact location may be derived with higher precision by interpolation. Interpolating is presumed to lie within the ambit of the skilled person and is therefore not further elucidated herein. It is however noted that, due to ignoring the initial time lapse between impact and first detection (t1-t0), the spread of coefficients is non-linear. The interpolation may be a relatively complex, non-linear interpolation for achieving high-accuracy or may be a relatively simple linear interpolation for reducing computational load, for example.

Based on the determined impact location, it may be determined whether the impact location 20 is within the center section 14, or not. For example, a look-up table may store every combination of coefficients that correspond to a position within the center section 14. Consequently, if a combination of coefficients is not present in the look-up table, the impact location 20 is outside the center section 14 and is therefore relatively close to an edge of the moveable panel 2a. Such impacts may be treated as a potential entrapment, while impacts in the center section 14 may be treated differently in accordance with the present invention.

Apart from the above-mentioned method to detect whether an impact was within the center section 14, it may be considered that at least one of the coefficients will be relatively large for a position outside the center section 14. So, in an embodiment, a potential entrapment situation may be detected by mere consideration of the coefficients and deciding that a potential entrapment has occurred if one or more of the coefficients exceed a predetermined threshold. Combinations of coefficients could be considered as well, of course.

In the embodiments of FIGS. 2A-4C, the accelerometers are presented as attached to the moveable panel 2a and, in particular, one accelerometer in each corner of the moveable panel 2a. Aspects of the present invention are however not limited to such particular embodiment. The accelerometers may be located at virtually any position on any assembly part that may be subject to acoustic waves, wherein the acoustic wave may be generated in such assembly part or may be received from a connected assembly part.

Figure 5:
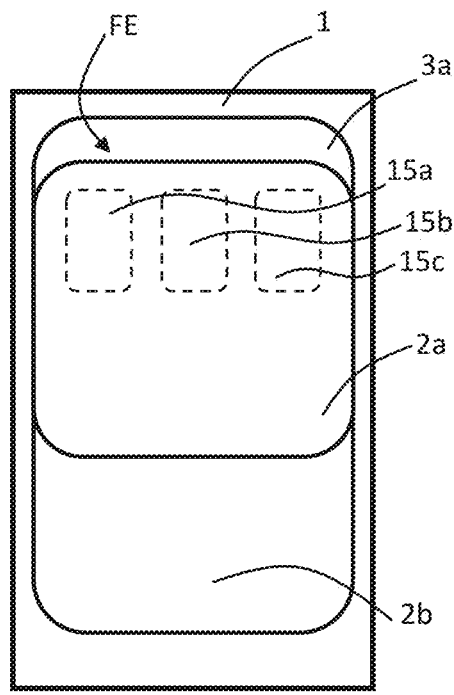
FIG. 5 shows a top view of a second embodiment of the open roof assembly.

FIG. 5 illustrates how the impact sensitivity of the open roof assembly 1 may be employed as a user interface. On the closure member, a first touch area 15a, a second touch area 15b and a third touch area 15c are defined. These areas 15a-15c are not necessarily physically different from the remainder of the closure member 2a. Still, an indication of the specific areas may be provided to a user. For example, a locally different color may be applied or the touch areas 15a-15c may be marked on the surface using paint or an adhesive label. In a particular embodiment, using special lighting effects the touch areas 15a-15c may be lighted, for example when an object, e.g. a finger, approaches one of the touch areas 15a-15c. For example, an image representing the associated function may be projected on the touch areas 15a-15c. Other lighting effects may be used as well, as apparent to those in the art.

The detection system is configured to provide an operating signal when an impact in one of these areas 15a-15c is detected, wherein the operating signal corresponds to the respective area 15a-15c that has been touched. For example, if a user touches the first touch area 15a, the closure member 2a may slide open; if the user touches the second touch area 15*b*, the closure member 2*a* may move into the tilt position and if the user touches the third touch area 15*c*, a rollo blind (not shown) may close. As the closure member 2*a* may not be accessible when it is in the open position, it may not be sensible to provide for a similar touch area for closing the closure member 2*a*. However, ticking against an edge at the front end FE of the closure member 2*a* may be defined as an operating command to close the closure member 2*a*. As a single impact may occur easily, the command may be more reliable if it were defined as a double impact, e.g. a double ticking at said edge. As apparent to those skilled in the art, any other sequence of impacts may be defined. Likewise, the touch areas may also be sensitive to certain impact sequences.

Many variations are envisaged. The commands may include commands for operating the closure member 2*a*, a rollo blind, lighting, and the like. Potentially, the operating commands are not limited to commands relating to the open roof assembly. Essentially, any command relating to a function of a vehicle may be defined, provided that the detection system is operatively connected to the components performing such function.

Figure 6:
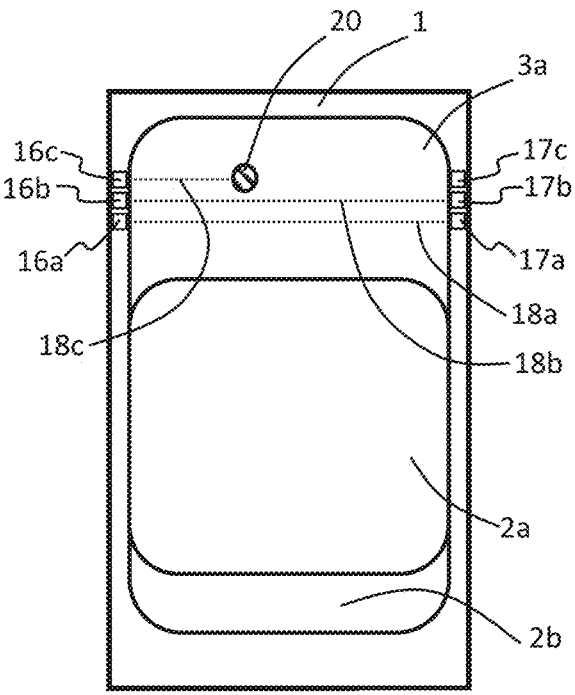
FIG. 6 shows a top view of a third embodiment of the open roof assembly.

FIG. 6 shows an embodiment, wherein an optical detection technique is used in the detection system. In more detail, three infrared beam transmitters 16*a*-16*c* have been provided on a first side of the roof opening 3*a* and three corresponding infrared receivers 17*a*-17*c*, respectively, have been provided on a second, opposing side of the roof opening 3*a*. Each transmitter 16*a*-16*c* emits a respective infrared beam 18*a*-18*c*. The infrared beams 18*a*-18*c* are emitted continuously and are continuously detected by the receivers 17*a*-17*c* to confirm that no blocking foreign object is present. In the illustrated situation, however, a foreign object 20 is present between a third transmitter 16*c* and a third receiver 17*c* such that a third infrared beam 18*c* is blocked. As a result, the third receiver 17*c* does not receive any infrared radiation. The detection system thus detects that the foreign object 20, blocking the infrared radiation, is present.

The foreign object 20 may be a finger of a user. The user may move his or her finger through the infrared beams 18*a*-18*c*, e.g. in a forward direction. In such movement, the finger first blocks a first infrared beam 18*a*, then blocks a second infrared beam 18*b* and then the third infrared beam 18*c*. Thus, by tracing the blocking finger over time, a trajectory of the finger movement may be detected. The finger movement, i.e. a gesture, may be used as a user control. The detection system interprets such a gesture and provides an operating signal to e.g. a control unit that executes a corresponding function.

The embodiment of substantially parallel infrared beams may be sensitive to disturbances and erroneous detections. For example, if one of the receivers is covered with dust or dirt, the closure member 2*a* cannot close anymore due to the fact that an obstructing foreign object is continuously detected.

Figure 7A:
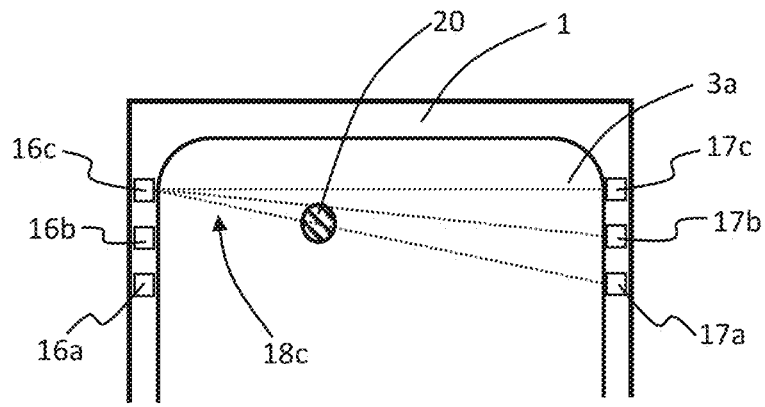
FIGS. 7A-7B show a top view of a fourth embodiment of an open roof assembly.

FIG. 7A illustrates an embodiment for reducing sensitivity to disturbances and errors. In this embodiment, the third infrared beam 18*c* is illustrated to have a wide angle such that each of the receivers 17*a*-17*c* detects a part of the third infrared beam 18*c*. A same wide-angle infrared beam may be emitted by the first and second transmitters 16*a*, 16*b*, thus providing a denser detection field. Moreover, with each transmitter 16*a*-16*c* emitting radiation to each receiver 17*a*-17*c*, the detection system becomes more reliable.

Figure 7B:
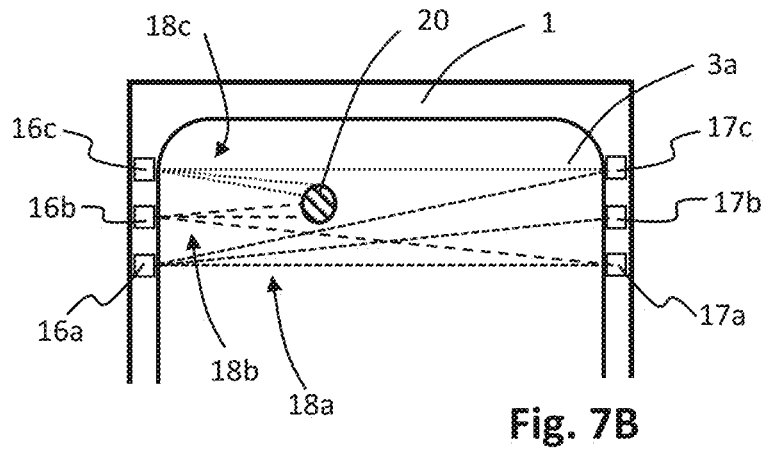

FIG. 7B illustrates a further embodiment, wherein a detailed self-diagnosis is enabled. The embodiment of FIG. 7B, like the embodiment of FIG. 7A, uses transmitters 16*a*-16*c* with respective wide-angled beams 18*a*-18*c*. The radiation emitted by the transmitters 16*a*-16*c* have been modulated with a predetermined modulation pattern, which may be used as a transmitter identifying signal. The term 'modulation' and 'modulation pattern' are intended to be construed broadly. Any temporal variation in the radiation beam may be regarded a modulation. Such temporal variation is advantageously used to enable to ignore any radiation from any other source, like infrared radiation originating from the sun, for example.

In the present embodiment, the modulation of each of the transmitters 16*a*-16*c* is different. Consequently, the three differently modulated radiation beams will be detected by each receiver 17*a*-17*c*. The receivers 17*a*-17*c* will detect radiation having a modulation that is a combination of the three modulated radiation beams 18*a*-18*c*. With a suitable selection of modulation patterns, the combined modulation may be traced back and the separate contributions from the three transmitters 16*a*-16*c* may be derived.

Deriving the separate contributions is well-known in the art. A receiver output signal, usually an electrical signal, may be supplied to suitable electronic circuitry that is configured to perform such operation. For example, suitable filters may be used to separate the three contributions using the predetermined modulation patterns. In another embodiment, the receiver output signal is supplied to a processing unit that mathematically separates the three contributions. For example, if the modulation patterns are differentiated by frequency, a Fourier transformation may provide the desired contributions. A person skilled in the art of signal design and signal processing is presumed to be able to select suitable modulation patterns and corresponding circuitry and/or techniques to separate such modulation patterns from the receiver outputs. Therefore, these features and components are not further elucidated herein.

Based on the separated contributions in combination with the predetermined field of detection, i.e. the area where a foreign object may be detected by the detection system, and the trajectories of the radiation beams, it is derivable whether a foreign object 20 is present in the field of detection (and at least one property, like its location or its velocity) or a transmitter is inoperable or a receiver is inoperable. As illustrated, if the foreign object 20 is present in the field of detection, a certain part of the radiation beams is blocked. In the illustrated situation, the second and the third receiver 18*b*, 18*c* do not receive radiation from the second transmitter 16*b* and the first and the second receivers 18*a*, 18*b* do not receive radiation from the second and the third transmitters 16*b*, 16*c*. Analysis of the three contributions as received by each of the three receivers 17*a*-17*c* will show the presence of the foreign object 20. With other combinations of contributions, such analysis may show that it is more likely that a disturbance is present. Of course, a diagnosis routine may be part of a start-up sequence, for example, wherein the inputs and outputs of the transmitters 16*a*-16*c* and the receivers 17*a*-17*c* is tested and evaluated before the closure member 2*a* is operated at all.

The self-diagnosis capability may be further improved by positioning both transmitters and receivers on each side of the roof opening 3*a*. In such embodiment, the radiation detected by the receivers at one side of the roof opening may be expected to have a certain correspondence to the radiation detected by the receivers at the opposing side, otherwise a potential error may be assumed.

Figure 8A:
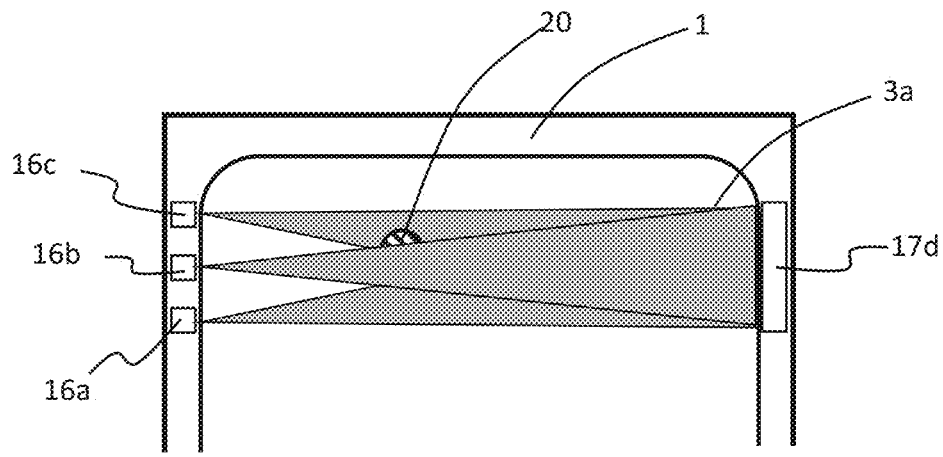
FIGS. 8A-8B show a top view of a fifth and a sixth embodiment, respectively, of an open roof assembly.

FIG. 8A illustrates a further embodiment, wherein a CCD-array receiver 17*d* is provided. Hence, a wide receiver field is provided removing gaps in the field of detection at the receiver side of the roof opening 3a.

Figure 8B:
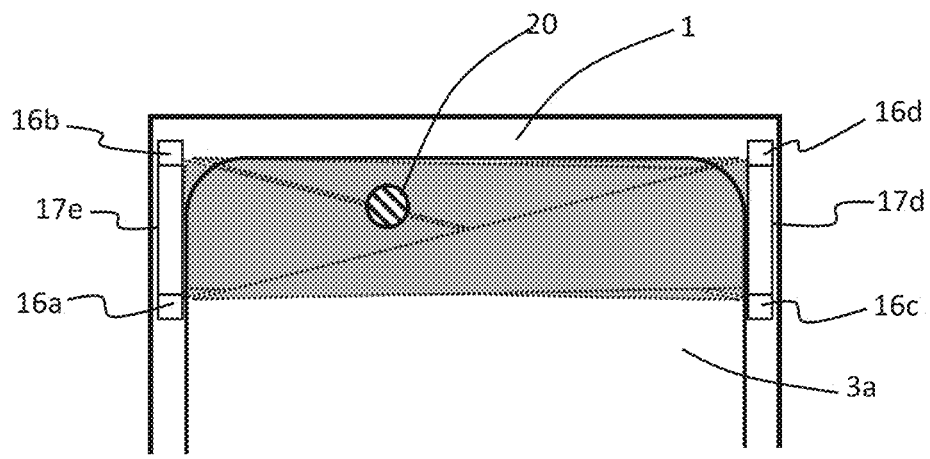

In the embodiment of FIG. 8B, two transmitters 16a, 16b and 16c, 16d are positioned on opposing sides of the roof opening 3a. Between each of the pairs of transmitters 16a, 16b and 16c, 16d a CCD-array receiver 17d, 17e, respectively, are provided. Thus, a virtually complete coverage of the roof opening 3a is provided.

Figure 9:
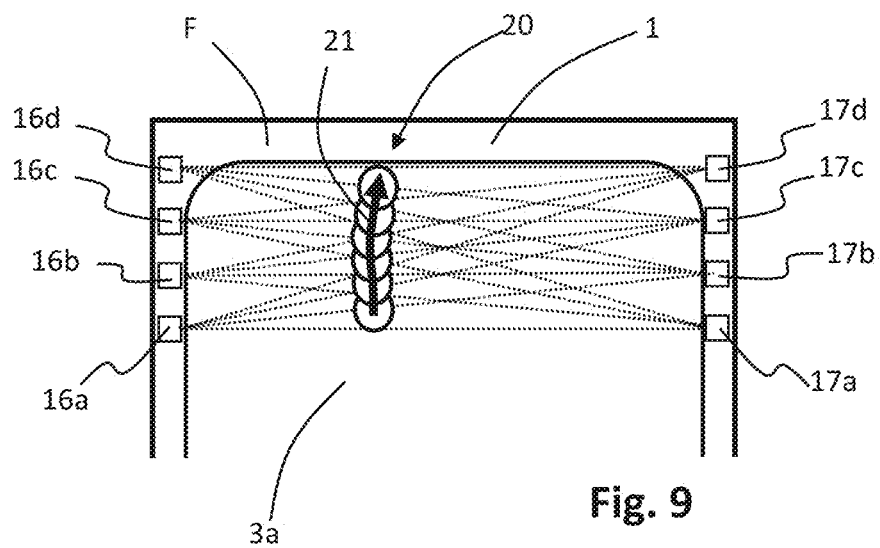
FIG. 9 shows a top view of a seventh embodiment of the open roof assembly.

FIG. 9 illustrates an embodiment having four transmitters 16a-16d and four receivers 17a-17d. The object 20 is shown multiple times corresponding to positions of the object 20 with a short time lapse between each. The object 20 is thus moved in a forward direction along a trajectory 21 and thus starts with blocking the radiation beam emitted by the first transmitter 16a and received by the first receiver 17a and from there moving towards a front F of the open roof assembly 1. The trajectory 21 is detectable by tracing the object 20 over time. Upon detection of such a trajectory, the detection system establishes that a user command is detected and an operating signal is provided to a control unit in order to execute such command.

As above mentioned, different gestures may be defined. Further, as mentioned in relation to the embodiment of FIG. 5, the commands do not need to be limited to relate to the open roof assembly 1.

Figure 10A:
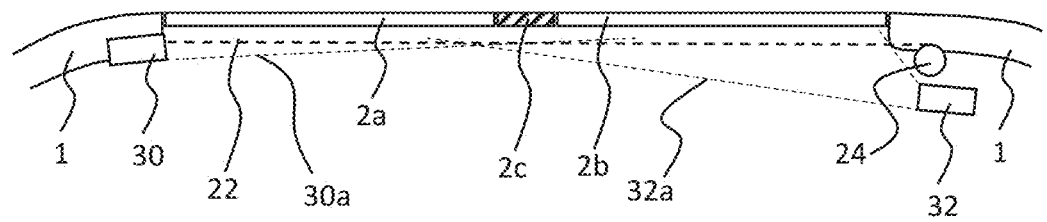
FIGS. 10A-10B show a cross-sectional view of an eighth embodiment of the present invention.
Figure 10B:
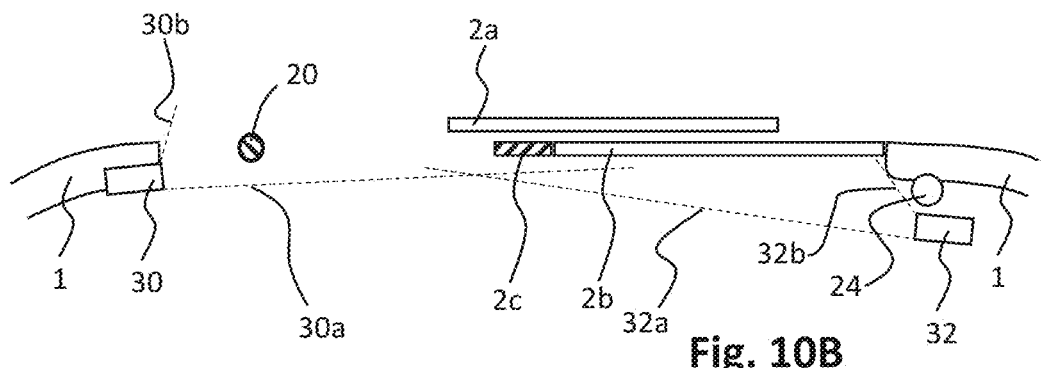

FIGS. 10A and 10B show a vehicle roof 1 provided with an open roof assembly with a first moveable panel 2a and a second fixed panel 2b. Between the moveable panel 2a and the fixed panel 2b, an optional middle beam 2c is shown. In this embodiment, a first optical detection system 30 and a second optical detection system 32 are provided. Each of the optical detection systems 30, 32 may be common digital cameras, for example, or may be any other suitable optical detection system, e.g. an infrared imaging system. The optical detector systems 30, 32 image a predetermined field of view. The field of view of the first optical detection system 30 and the second optical detection system 32 is shown as FOV-borders 30a, 30b and 32a, 32b, respectively.

In the illustrated embodiment, the first optical detection system 30 is arranged in front of (as seen in a normal driving direction of the vehicle) the open roof assembly and close to a lower surface of the moveable panel 2a. In the closed state of the moveable panel 2a as shown in FIG. 10A, the first optical detection system 30 images an area directly below the moveable panel 2a such to enable to detect an object like a finger providing an operating command. In the open state as shown in FIG. 10B, the field of view extends through the opening in the vehicle roof 1 such to enable to detect an object 20 in the opening. In the open state, the open roof assembly may distinguish between a potential entrapment of the detected object or an operating command of such object in accordance with the present invention.

Further, in the illustrated embodiment, the second optical detection system 32 is arranged in a rear area close to a lower surface of the fixed panel 2b. A sunshade holder 24 is arranged in the rear area as well and is configured to hold a flexible web 22 that may be moved to extend below the moveable panel 2a and the fixed panel 2b to protect the interior of the vehicle against excessive sunlight, for example.

In this embodiment, the second optical detection system 32 may not be required for prevention of an entrapment by the moveable panel 2a and as such it is noted that the second optical detection system 32 is optional. The second optical detection system 32 may be provided for enabling to provide an operating command near the fixed panel 2b as well as near the opening of the moveable panel 2a. Further, the second detection system 32 may be used to prevent a collision between an object and a leading edge of the sunshade web 22, for example.

The first and second optical detection systems 30, 32 are both shown schematically. In a practical embodiment, they may comprise an optical detector and further optical elements like lenses. Further, they may be provided with an automatic focus system, where appropriate. The images received from the optical detection systems 30, 32 may be processed by suitable image processing software running on a generic image processing unit or by a dedicated image processing unit. The image processing may include stitching the images recorded by the two separate detection systems 30, 32, for example. It is noted that a camera system for detecting objects, object movements and predetermined gestures are known in the prior art. Therefore, a detailed description of such a processing system is omitted herein.

Figures 11A, 11B:
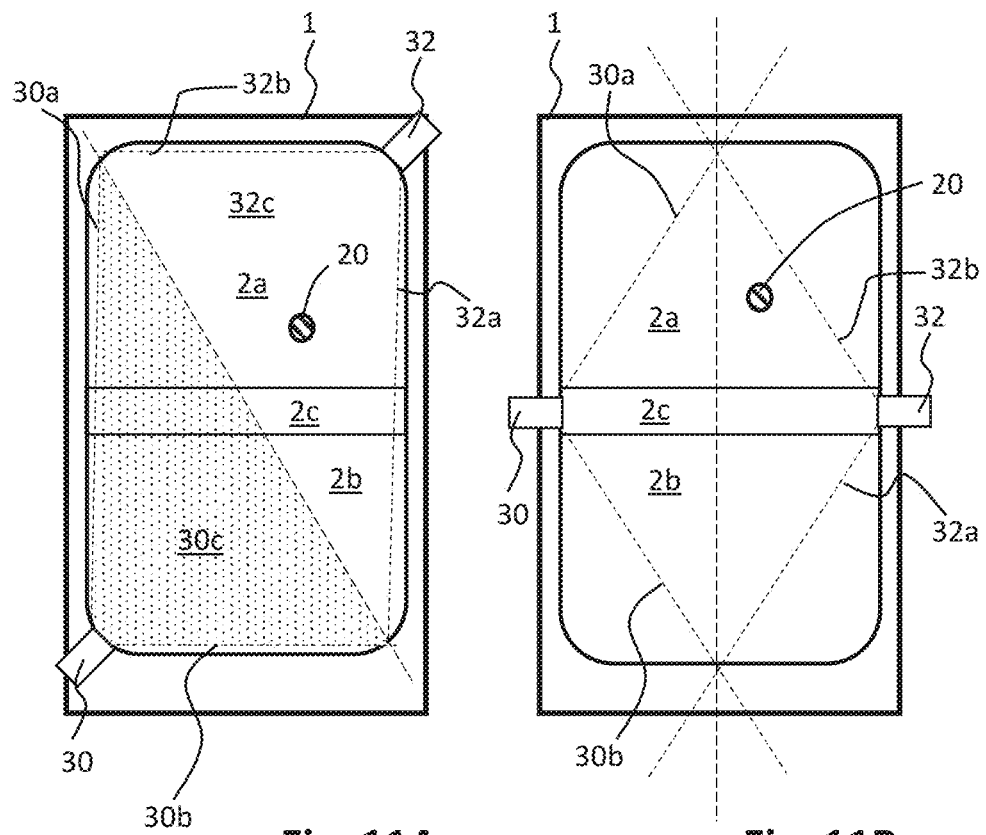
FIG. 11A shows a cross-sectional view of a ninth embodiment of the present invention.
FIG. 11B shows a cross-sectional view of a tenth embodiment of the present invention.

FIG. 11A shows a top view of another embodiment wherein two optical detection systems 30, 32 have been arranged at opposing corners of the open roof assembly. As compared to the embodiment of FIGS. 10A and 10B, the field of view of each detection system 30, 32 have been arranged differently. As an example, an effective field of view 30c of the first optical detection system 30 is dotted. The fields of view of the two detection systems 30, 32 together cover the area of the moveable panel 2a and the fixed panel 2b. For example, a finger 20 may move through the field of view 32c of the second detection system 32 parallel to the middle beam 2c and thus into the field of view 30c of the first detection system 30. The processing system (not shown) is configured to detect and process the whole movement despite the transition from one of the fields of view 32c to the other field of view 30c.

In an embodiment as shown in FIG. 11B, the fields of view of both optical detection systems 30, 32 overlap significantly. For example, an object 20 may be arranged in both fields of view. Such large overlap may ease image processing for an object moving from one field of view to the other. Still, as above mentioned, an optical detection system for detecting objects and gestures are as such known from the prior art and further details of possible embodiments are omitted herein.

As described herein, the detection system has a function of preventing entrapment of a foreign object. The detection system may be an additional entrapment detection system next to another detection system. Similarly, the detection system has a function of providing a user interface. This user interface functionality may be additional to another user interface, like switches or a user interface application running on a portable computer device, e.g. smartphone, having a touch-sensitive panel, possibly connected over the Internet or over a local connection using a local communication protocol like Bluetooth. Further, it should be borne in mind that the specific embodiments described herein may as well be used for entrapment detection only or user interface functionality only.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open roof assembly for providing a closable roof opening in a vehicle roof, the open roof assembly comprising a closure member that is moveably arranged for opening and closing the roof opening and a detection system for detecting an object in the roof opening and for providing a signal to a control unit for controlling movement of the closure member of a vehicle having the vehicle roof, wherein the detection system is configured to
    determine at least one property of the object;
    select a signal from a group of signals, dependent on the determined at least one property of the object, wherein the group of signals comprises an entrapment signal and an operating signal to instruct the control unit to perform a user controlled operation; and
    provide the selected signal to the control unit; and
    wherein the detection system comprises a mechanical impact detection and localization system, the mechanical impact detection and localization system being configured to detect a mechanical impact and to ascertain a position of the mechanical impact, and wherein the detection system is configured to provide:
    the entrapment signal when a mechanical impact is detected in an edge section of the closure member; and
    the operating signal when a mechanical impact is detected in a center section of the closure member.

2. The open roof assembly according to claim 1, wherein the detection system is configured to provide the entrapment signal when the detected object prevents the closure member from moving to a predetermined position.

3. The open roof assembly according to claim 1, wherein the detection system is configured to select the operating signal and provide the operating signal when the detected object performs a predefined action.

4. A vehicle comprising an open roof assembly for providing a closable roof opening in a vehicle roof, the open roof assembly comprising a closure member that is moveably arranged for opening and closing the roof opening and a detection system for detecting an object in the roof opening, the vehicle having a control unit for controlling movement of the closure member, wherein the detection system is configured to
    determine at least one property of the object;
    select a signal from a group of signals, dependent on the determined at least one property of the object, wherein the group of signals comprises at least an entrapment signal and an operating signal to instruct the control unit to perform a user controlled operation; and
    provide the selected signal to the control unit; and
    wherein the detection system comprises a mechanical impact detection and localization system, the mechanical impact detection and localization system being configured to detect a mechanical impact and to ascertain a position of the mechanical impact, and wherein the detection system is configured to provide:
    the entrapment signal when a mechanical impact is detected in an edge section of the closure member; and
    the operating signal when a mechanical impact is detected in a center section of the closure member.

5. The vehicle according to claim 4, wherein the detection system is configured to provide the entrapment signal when a detected object prevents the closure member from moving to a predetermined position.

6. The vehicle according to claim 5, wherein the detection system is configured to select the operating signal and provide the operating signal when the detected object performs a predefined action.

* * * * *